March 16, 1943.　　L. BOOR ET AL　　2,314,193
SELF RELEASING MACHINE DRIVE
Filed March 4, 1941

INVENTORS
LADISLAV BOOR
CHESMAN H. BOURDELAIS
BY Elizabeth Ann Krider
AGENT.

Patented Mar. 16, 1943

2,314,193

UNITED STATES PATENT OFFICE 2,314,193

SELF-RELEASING MACHINE DRIVE

Ladislav Boor, New Canaan, and Chesman Henry Bourdelais, Stamford, Conn., assignors to American Cyanamid Company, New York, N. Y., a corporation of Maine Application March 4, 1941, Serial No. 381,742

1 Claim. (Cl. 265—12)

This invention relates to a self-releasing clutch, and more particularly to an improved machine drive embodying a clutch which releases automatically upon removal of the load being driven.

Many problems have arisen in industry and in the laboratory due to the lack of a machine drive mechanism which is adapted to transmit considerable power when loaded but which will stop at the instant the load is removed. An outstanding field in which such problems frequently arise is the field of testing materials where accurate determinations depend on the speed with which the drive mechanism becomes disconnected from the testing machine after the test material has broken, i. e., after the load has been removed from the driving mechanism.

Applicants have found that the above problems may be solved by applying the improved driving mechanism of the present invention with its automatically releasing clutch, to a testing machine. The clutch automatically disengages at the instant of fracture of the material being tested and this, of course, results in a more accurate determination of the strength of the material.

While the improved machine drive of the present invention may be utilized in any machine, applicants have found it especially adapted for use with the Dynstat testing machine. This machine, which is manufactured by the firm Louis Schopper, Leipzig, has found wide application in the determination of the transverse strength of such materials as synthetic resins, plastics, hard wood, hard rubber, glass, composition board, etc. In fact, it may be used to test any material which breaks within the range of load of the machine. Replacement of the old conventional hand crank drive of a Dynstat testing machine by a machine drive, preferably motor driven, embodying the self-releasing clutch of the present invention provides a more uniform rate of stressing and produces more accurate determinations. Uniformity of result is further increased since the drive is independent of the load. Handcranking against a heavy load is at best a jerky proposition and non-uniform, inaccurate determinations necessarily result. The disadvantage is completely eliminated by the machine drive of the present invention.

The self-releasing clutch will be described with specific reference to its embodiment in the drive of a Dynstat testing machine, but it should be understood that applicants do not intend to limit their invention to that specific embodiment. Referring to the drawing, Fig. 1 is a front elevation of the Dynstat testing machine having a drive mechanism which includes the automatically releasing clutch of the present invention;

Figure 3:
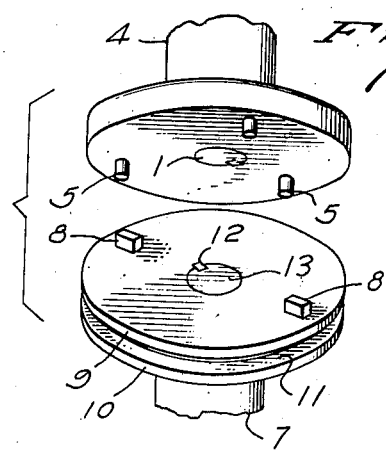
Fig. 3 is a detail perspective view of the clutch members.
Figure 2:
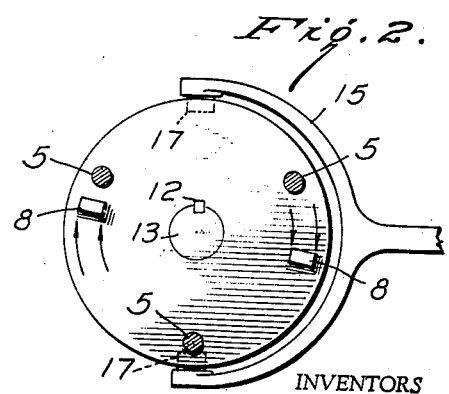
Fig. 2 is a section taken along the line 2—2 of Fig. 1.

The drive mechanism is connected to a conventional Dynstat testing machine by means of the shaft 1 which is supported at 2 by a bracket 3. The upper clutch member 4 with downwardly engaging pins 5 is fixed to the shaft 1 by means of pin 6. Lower clutch member 7 with upwardly extending lugs 8 is provided with flanges 9 and 10, thus providing a circumferential groove 11 for the purpose hereinafter described, and is keyed at 12 (see Fig. 3) to shaft 13, which is driven by motor 14, in such a way that it is free to slide vertically on the shaft but is incapable of any rotary motion independent of the shaft. A forked lever 15, which is pivoted at 16, is joined to lower clutch member 7 by means of roller pins 17 (see Fig. 2) which are set in the forked end of the lever and extend into the circumferential groove 11 referred to above. Such an arrangement makes it possible for lower clutch member 7 to rotate freely with shaft 13, but any vertical movement of lower clutch member 7 along shaft 13 is accompanied by a corresponding displacement of lever 15. The force exerted by spring 18 on lever 15 tends to disengage lower clutch member 7 and the amount of this force may be varied by means of the adjusting screw 19.

Figure 1:
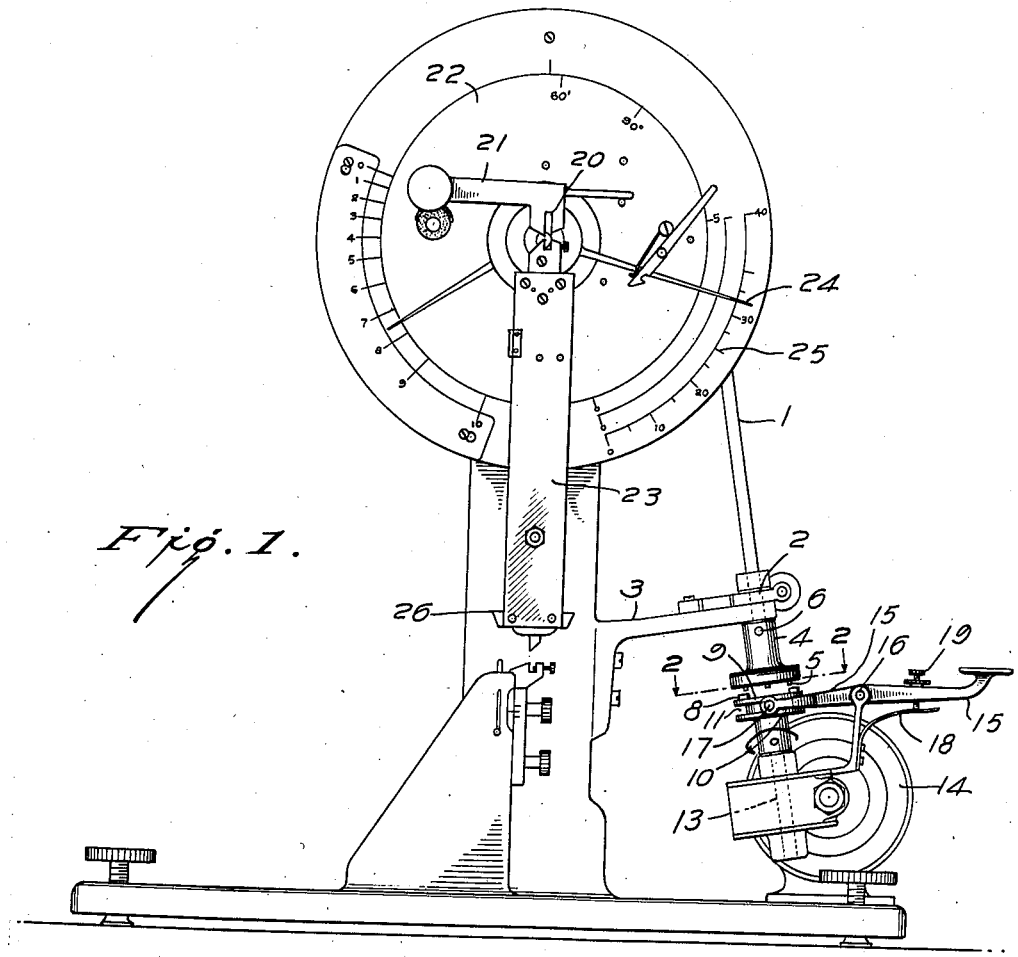

Fig. 1 shows a Dynstat testing machine set for determination of the transverse strength of a sample by means of bending tests and accordingly the operation of applicants' device will be described in detail in connection with such a determination. The sample to be tested is placed at 20 between the arm 21, which is fixed to inner plate 22, and pendulum 23 of the conventional Dynstat. After the motor 14 is started up, thus setting in motion the shaft 13 and lower clutch member 7 in the direction indicated by the arrow on the drawing, the lever 15 is depressed, the lower clutch member 7 is moved upward on the shaft 13 and becomes engaged with the upper clutch member 4. Lower clutch member 7 is prevented from dropping out of engagement with upper clutch member 4 so long as the sum of the forces exerted on the lever 15 by the spring 18 and by gravity is less than the frictional force between pins 5 and lugs 8, which frictional force varies directly as the load on shaft 1. Shaft 1,